United States Patent
Bansal et al.

(10) Patent No.: US 12,143,314 B2
(45) Date of Patent: *Nov. 12, 2024

(54) POOLING SMART NICS FOR NETWORK DISAGGREGATION

(71) Applicant: MICROSOFT TECHNOLOGY LICENSING, LLC, Redmond, WA (US)

(72) Inventors: Deepak Bansal, Bellevue, WA (US); Gerald Degrace, Atlanta, GA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 342 days.

This patent is subject to a terminal disclaimer.

(21) Appl. No.: 17/676,029

(22) Filed: Feb. 18, 2022

(65) Prior Publication Data
US 2023/0269201 A1    Aug. 24, 2023

(51) Int. Cl.
*H04L 49/00* (2022.01)
*G06F 9/50* (2006.01)
*H04L 12/46* (2006.01)

(52) U.S. Cl.
CPC ........... *H04L 49/30* (2013.01); *G06F 9/5077* (2013.01); *H04L 12/4641* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 10,997,106 B1* | 5/2021 | Bandaru | G06F 13/385 |
| 2020/0278892 A1* | 9/2020 | Nainar | H04L 67/10 |
| 2021/0266376 A1* | 8/2021 | McBride | H04L 67/51 |
| 2021/0314232 A1* | 10/2021 | Nainar | H04L 41/122 |
| 2022/0021556 A1 | 1/2022 | Kreger-stickles et al. | |
| 2022/0032441 A1* | 2/2022 | Wierzchon | B32B 27/302 |
| 2022/0164451 A1* | 5/2022 | Bagwell | H04L 63/0428 |
| 2022/0206908 A1* | 6/2022 | Brar | G06F 11/2005 |
| 2022/0278911 A1* | 9/2022 | Padala | H04L 41/40 |
| 2022/0377012 A1* | 11/2022 | Doddapaneni | H04L 67/10015 |
| 2023/0109231 A1* | 4/2023 | Adogla | H04L 41/40 709/223 |

OTHER PUBLICATIONS

"International Search Report and Written Opinion issued in PCT Application No. PCT/US2022/050039", Mailed Date: Mar. 17, 2023, 12 Pages.

* cited by examiner

*Primary Examiner* — Jenkey Van
(74) *Attorney, Agent, or Firm* — Han Gim; Newport IP, LLC

(57) ABSTRACT

Techniques are disclosed for processing data packets and implementing policies in a software defined network (SDN) of a virtual computing environment. A plurality of servers are communicatively coupled to network interfaces of one of a skinny NIC or a smart NIC. The skinny NIC is configured to provide network interfaces for virtual machines hosted on a corresponding server. The smart NIC is configured to enable virtual machine communications within a virtual network in accordance with associated policies.

20 Claims, 12 Drawing Sheets

POOLING SMART NICS FOR NETWORK DISAGGREGATION

BACKGROUND

A data center may house computer systems and various networking, storage, and other related components. Data centers may, for example, be used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic and efficiently utilizing the physical and virtual network devices are important for maintaining scalability and efficient operation in such networks.

It is with respect to these considerations and others that the disclosure made herein is presented.

SUMMARY

A typical computing rack of a cloud service provider may have at least one top-of-rack (ToR) switch (two or more if redundancy is provided) and a number of servers. Each of the servers may have a special cloud-based network interface card (NIC), which may be referred to as a smart NIC ("SmartNIC"). At a minimum, a SmartNIC may allow for each virtual machine (VM) to talk to any other VM through various types of virtual tunneling mechanisms. This may ensure that a virtual network can be instantiated in which all data communications are contained within the virtual network's boundaries and no other customer's VMs can communicate with it in any way.

Typically, each server may have a number of VMs with at least one SmartNIC. The SmartNIC provides a virtual interface to every VM on the server. Through application of policies, each VM can be programmed to communicate with any other VM within its virtual network with a series of complex policies. These VMs can be on the same machine or a different machine, and even in another datacenter. The policies can be complex and numerous and require a high level of processing and memory associated with their implementation.

In various embodiments disclosed herein, SmartNICs may be disaggregated from the servers, where traditional NICs are typically housed. A typical server may only require a lower cost and low function skinny NIC ("SkinnyNIC") (i.e., a NIC without sophisticated offload processing functions such as policy-enforcement capability) that is deployed at a network interface rate required by the server. The NIC requirements may be different for each server depending on the server's needs. In one example, the SkinnyNIC's primary role can be to provide secure virtual tunnels to a remote SmartNIC that may then provide the final cloud policies to allow the VMs to securely communicate. In this way, the SmartNICs can be located more centrally and/or independently of the physical location of the servers, and thus serve an arbitrary number of VMs that are not constrained to a particular server. From the SmartNIC's point of view, a SmartNIC may serve N VMs where N can be scaled based on the SmartNIC's processing, memory, and other advanced capabilities.

The described techniques can allow for virtual computing environments to support a variety of configurations while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
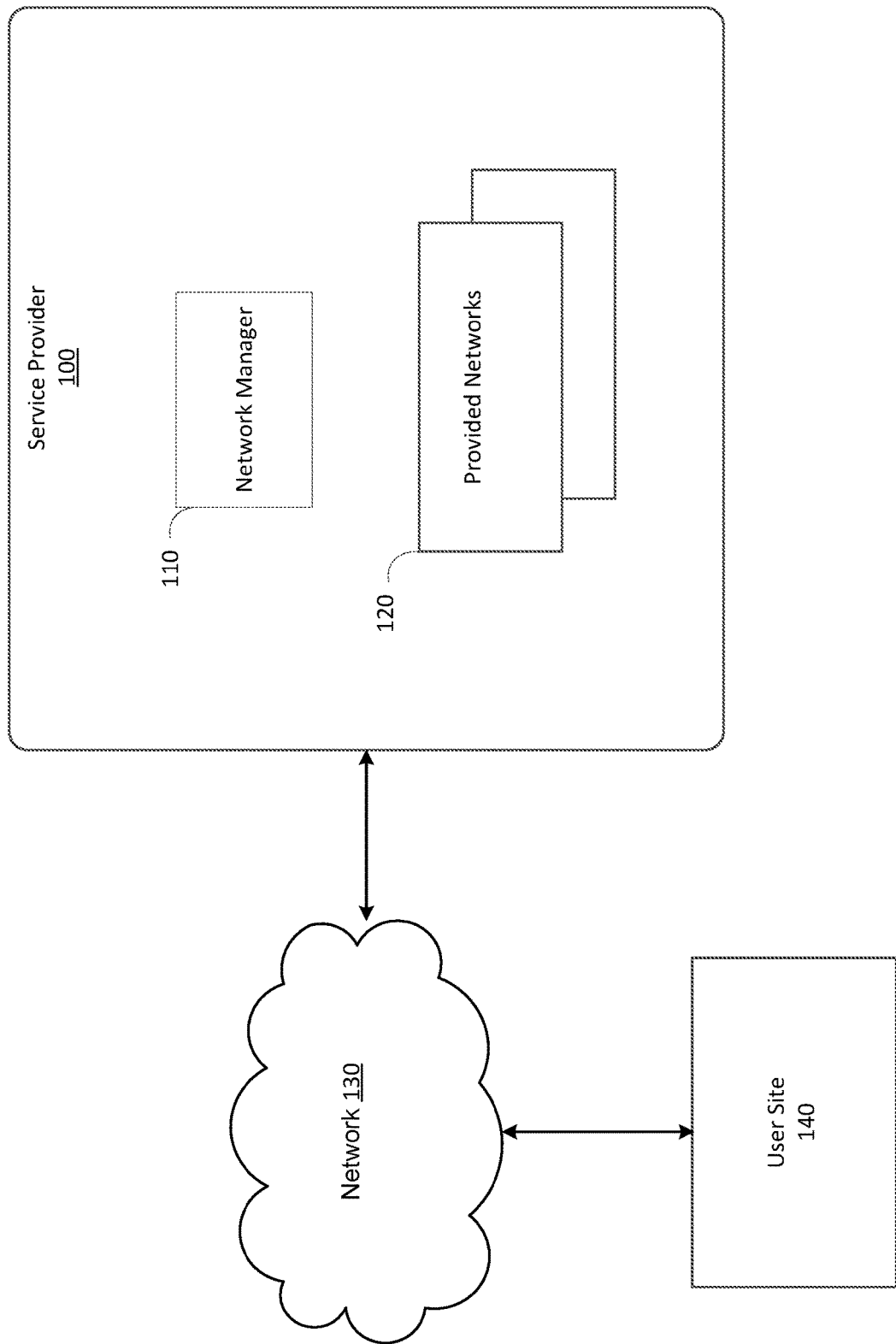
FIG. 1 is a diagram illustrating an example architecture in accordance with the present disclosure.

The disclosed embodiments enable datacenters to provide services in a manner that can enhance system flexibility and efficiency while reducing cost and complexity, allowing for more efficient use of computing, storage, and network resources. Efficient implementation of the end-to-end services by a cloud service provider can enable an experience that is seamless and more consistent across various footprints. The effective distribution of the described disaggregation and pooling techniques can be determined based on the implications for various performance and security implications such as latency and data security.

The various embodiments disclosed herein provide a way to pool SmartNICs independently of physical hosts. In an embodiment, SmartNICs may be installed on servers, ToR devices, SDN appliances, or other locations within a data center. Servers that host VMs may have a Skinny NIC or a SmartNIC, but need not have both. As used herein, "skinny" NICs may be standard NICs without SmartNIC functionality. As used herein, a SmartNIC may be a hardware-based acceleration device that may implement various ways of leveraging hardware acceleration and offloading techniques to perform a function, such as, for example, implementing tasks in hard ASIC logic, implementing tasks in soft (configurable) FPGA logic, implementing some tasks as software on FPGA software processor overlays, implementing some tasks as software on hard ASIC processors, or a combination thereof. In some embodiments, the hardware-based acceleration device may be a network communications device, such as a network interface card (NIC). Such a NIC may be referred to herein as a SmartNIC.

A typical computing rack of a cloud service provider may have at least one top-of-rack (ToR) switch (two or more if redundancy is provided) and a number of servers. Each of the servers may have a SmartNIC. A SmartNIC may allow for each virtual machine (VM) to talk to any other VM through various types of virtual tunneling mechanisms. This can ensure that a virtual network can be instantiated where data communications are contained within the virtual network boundaries and no other customer's VMs or other external VMs can communicate with it in any way.

Typically, each server may have a number of VMs with at least one SmartNIC. The SmartNIC may provide a virtual interface to every VM on the server. Through policy, each VM can be programmed to communicate with any other VM within its virtual network with a series of complex policies. These VMs can be on the same machine or a different machine, and even in another datacenter. The policies can be complex and numerous and require a high level of processing and memory associated with their implementation.

The capability of the SmartNIC to process cloud policies and form virtual networks may be greater than the need of a single server. For example, SmartNICs may have 1.6 Tbps capacity and higher. At the same time, a typical server may only require 100-200 Gbps for most applications. In many scenarios, servers can be served with 25-50 Gbps capacity. The present disclosure provides some of the architectural changes needed to leverage the capabilities and efficiencies enabled by the expanding capabilities of SmartNICs.

In various embodiments disclosed herein, SmartNICs may be provided as a pooled resource and implemented independently of the number of servers in a rack or other configurations. A typical server may only require a lower cost and lower capacity SkinnyNIC that is deployed at a network interface rate required by the server. The network interface rate may be different for each server depending on the server's needs. In an embodiment, the SkinnyNIC's primary role can be to provide secure virtual tunnels to a remote SmartNIC that may then implement the final cloud policies to allow the VMs to securely communicate as needed. In this way, the SmartNICs can be located more centrally and/or independently of the physical location of the servers, and thus serve an arbitrary number of VMs that are not constrained to a particular server. From the SmartNIC's point of view, the SmartNIC may serve N VMs where N can be scaled based on the SmartNIC's processing, memory, and other advanced capabilities.

By pooling SmartNICs according to the disclosed embodiments, connections from a single VM may be distributed across multiple SmartNICs that are being managing as a pool. By distributing the connections across a pool of SmartNICs, the processing power of any one SmartNIC may be utilized at most by 1/N where N is the number of SmartNICs across which connections are distributed.

In some embodiments, SDN controllers may be configured to manage SMARTNICs as a pooled resource and in a distributed manner. For example, some VMs may be distributed across X SmartNICs and other VMs may be distributed across Y SmartNICs. The SDN appliance may track the pool of SmartNICs and determine the capacity so that the distribution can be performed intelligently and provide suitable SLAs for processing.

A pool of SmartNICs may also be managed to create a high availability (HA) environment. In an embodiment, the SDN controller may provision the same VMs across one or more pools of SmartNICs while the connections are distributed to one pool unless there is a failure. The pools on which the VMs are provisioned may be managed such that a VM is distributed across one pool so that if a SMARTNIC or pool of SMARTNICs become unavailable through planned maintenance or unplanned faults, the connections may automatically be moved to an alternate pool that has been synchronizing connection state but not forwarding packets.

In some embodiments, SmartNICs may be integrated within a SmartToR or a dedicated appliance configured to house a number of SmartNICs. In other embodiments, SmartNIC functionality may be housed on M of N servers in a given deployment, which may allow for a more cost-effective implementation than housing a SmartNIC on every server, or having both a Skinny NIC and a Smart NIC on a server.

A server that houses a SmartNIC may only need a portion of the capability of the SmartNIC. For example, an 800 Gbps SmartNIC may be housed on a server requiring only 50 Gbps network access. The remaining 750 Gbps can then be used to provide software defined networking (SDN) capabilities for other servers or processing agents. Other servers that have SkinnyNICs may tunnel their traffic to the SmartNIC to access the SmartNIC's capabilities.

In an embodiment, each server may have either a SkinnyNIC or SmartNIC. The ratio of SkinnyNICs to SmartNICs may be implemented based on the needs for a particular environment. This in turn allows for SmartNICs to be developed with capabilities and independently of any particular server. As a server only requires one NIC, the cost of implementation can be optimized based on the particular architecture. For example, the number of SmartNICs that are deployed may be optimized based on the number of outputs that are desired from a given rack or row.

Other advantages of disaggregating SkinnyNICs and SmartNICs include reduced power consumption as the advanced networking processing can be deployed much closer to the actual need versus arbitrarily to each server. Since SkinnyNICs consume less power than SmartNICs, having more servers deployed with SkinnyNICs allows for more power in a given rack to add, for example, processing or storage functions which are typically limited by the total power consumed by the rack.

The disclosed embodiments allow for any specific arrangement of SkinnyNICs and SmartNICs provided that the SkinnyNICs and SmartNICs are configured with adequate network connectivity to allow for the SkinnyNICs to tunnel traffic to the SmartNICs, and that the SmartNIC provides adequate capacity towards the overall network. Ethernet-based networks are becoming extremely cost effective and make up a much smaller proportion of the cost of a network as compared to smart processing. The present disclosure allows for service providers to lower operational costs by allowing the providers to design their networks with SkinnyNICs and SmartNICs with any arbitrary bandwidth as required by the rack or multi-rack design.

As an example, a rack may have a ToR that provides connectivity to the SkinnyNIC or SmartNIC at a rate equal to each NIC's capabilities. The ToR may be selected such that it satisfies the aggregate connectivity needs and supports the required interface speeds.

The present disclosure allows for a flexible distribution of SmartNICs and does not require that a SmartNIC be housed on any particular rack. For example, a rack may only have SkinnyNICs where the VMs are tunneled to other racks that contain servers with SmartNICs. Any arbitrary connectivity is allowed provided that the tunnels between the SkinnyNIC and the SmartNIC are secure.

Additionally, a SkinnyNIC can have multiple interfaces and can tunnel VMs to multiple SmartNICs for redundancy or functionality reasons. SmartNICs can provide high availability through replication or other means and hence availability of the approach is not limited to a one-to-one relationship between the SkinnyNIC and SmartNIC.

Referring to the appended drawings, in which like numerals represent like elements throughout the several FIGURES, aspects of various technologies for network disaggregation techniques and supporting technologies will be described. In the following detailed description, references are made to the accompanying drawings that form a part hereof, and which are shown by way of illustration specific configurations or examples.

In some of the illustrated example scenarios described herein, SDN capabilities may be enhanced by disaggregating policy enforcement from the host and moving it elsewhere on the network, such as onto an SDN appliance. Software defined networking (SDN) is conventionally implemented on a general-purpose compute node. The SDN control plane may program the host to provide core network functions such as security, virtual network, and load balancer policies. In some implementations that use a rack level switch such as a top-of-rack (ToR) switch, such devices typically do not have the capability to perform transforms. An SDN appliance can be used to host these agents and provide switch functionality, and can further provide transformations and connectivity. The SDN appliance can accept policies that perform transformations. In some embodiments, an agent can be implemented that programs the drivers that run on the SDN appliance. The traffic sent by workloads can be directed through the SDN appliance, which can apply policies and perform transformations on the traffic and send the traffic to the destination.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

FIG. 1 illustrates an example computing environment in which the embodiments described herein may be implemented. FIG. 1 illustrates a service provider 100 that is configured to provide computing resources to users at user site 140. The user site 140 may have user computers that may access services provided by service provider 100 via a network 130. The computing resources provided by the service provider 100 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the user site 140.

Figure 2:
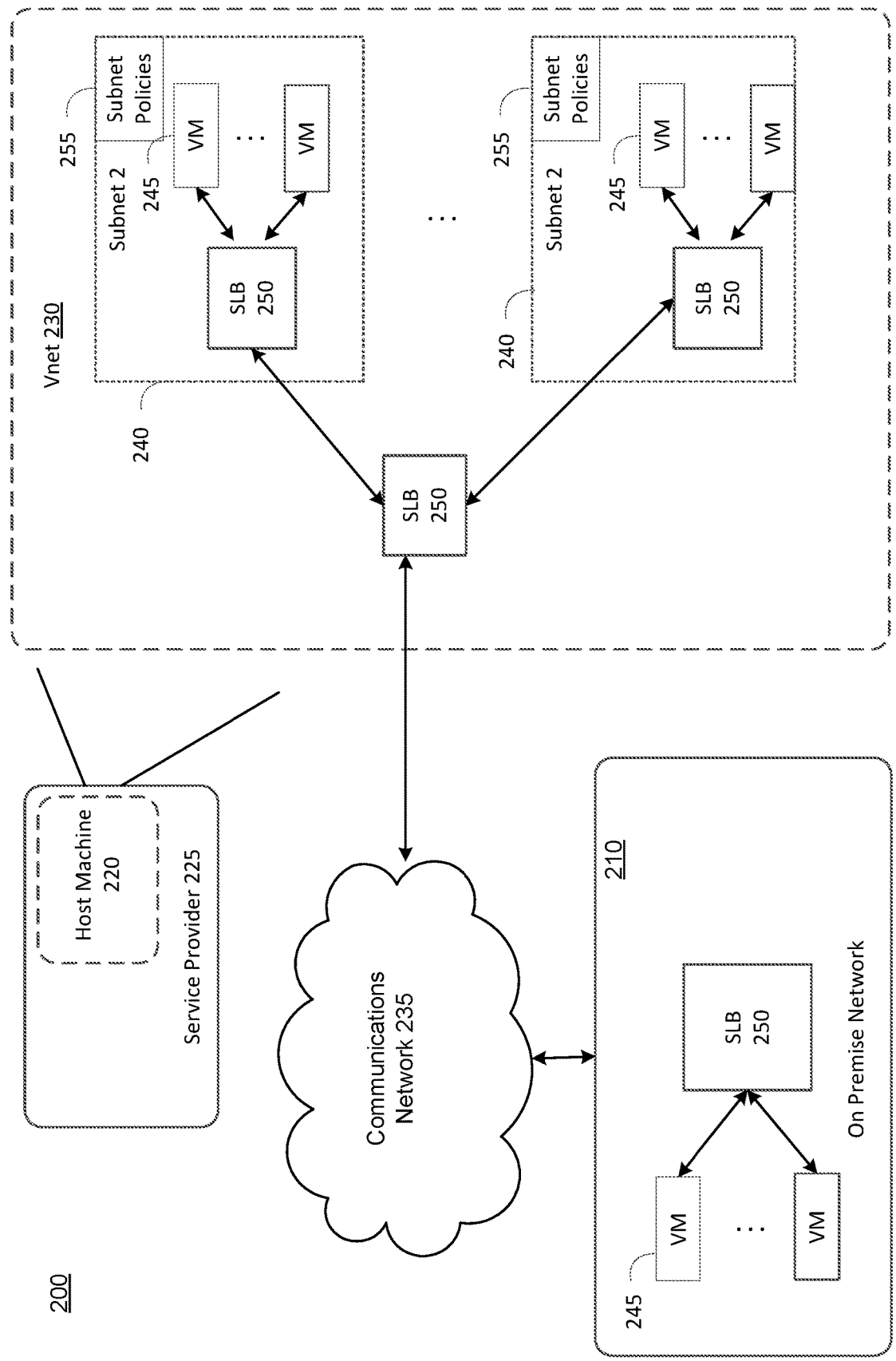
FIG. 2 is a diagram illustrating a data center in accordance with the present disclosure.

FIG. 2 shows an illustrative cloud computing environment 200 in which a customer network 205 includes multiple portions including an on-premises network 210 and a virtual network (VNet) 230. The customer network in this example is a hybrid network but other network configurations may also be utilized depending on the particular requirements of the user scenario. The VNet may be physically implemented using one or more host machines 220 that are operated by a cloud service provider 225. It is noted that the diagram in FIG. 2 is simplified for clarity in exposition and typical networking equipment such as firewalls, routers, and the like are not shown.

The on-premises network and VNet are typically operatively coupled using instances of gateways 220, or other networking devices, over a communication network 235 which may include, for example, private and/or public networking infrastructure using various combinations of connectivity services. The VNet may include multiple subnets 240 that each include one or more instances of virtual machines 245 that are typically connected using load balancers 250 and/or other networking devices. Security and other networking policies (collectively indicated by reference numeral 255) are typically applicable to each subnet. The networking policies are typically different for each subnet, but they can be the same and/or overlap in some cases.

The cloud computing environment 200 may be provided via a data center configured to provide computing resources to users via communications network 235. The computing resources provided by the data center may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

The data center may include servers that may be stand-alone or installed in server racks, and provide computing resources available as virtual machines 245. The virtual machines 245 may be configured to execute applications such as Web servers, application servers, media servers, database servers, and the like. Other resources that may be provided include data storage resources may include file storage devices, block storage devices, and the like. The communications network 235 may, for example, be a publicly accessible network of linked networks and may be operated by various entities, such as the Internet. In other embodiments, communications network 235 may be a private network, such as a corporate network that is wholly or partially inaccessible to the public.

Communications network 235 may provide access to various computers that may be a server, a desktop or laptop personal computer, a tablet computer, a smartphone, a set-top box, or any other computing device capable of accessing the data center.

In the example cloud computing environment 200, a network device may be utilized to interconnect the servers. The network device may comprise one or more switches, routers, or other network devices. The network device may facilitate communications within networks in the data center, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 200 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 3:
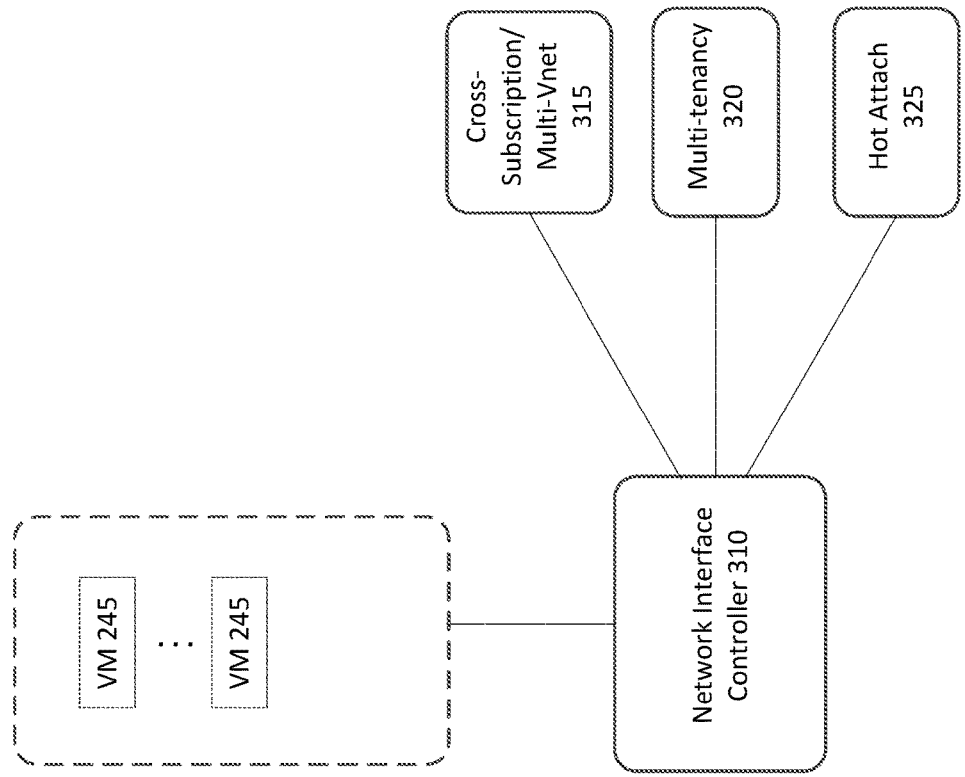
FIG. 3 is a diagram illustrating an architecture for implementing virtual services in accordance with the present disclosure.

FIG. 3 shows an illustrative NIC 310 that may be utilized to support a variety of scenarios. The NIC may be implemented in this example as virtualization of a network interface at the host supporting the VM 245 using a container model, although physical embodiments may be utilized in some scenarios. The NIC 310 provides identity, connectivity, and discoverability for the VMs in the customer's VNet. The NIC 310 enables flexibility for various VM deployment scenarios. The flexibility enables rapid provisioning of a variety of cloud-computing features and services on an on-demand basis without needing to alter the fundamental workflow in a given VM/VNet/subnet while conforming with applicable networking policies.

As shown in FIG. 3, the use scenarios illustratively include, for example, cross-subscriptions and multi-VNet homing 315, multi-tenancy and subnet sharing 320, and pre-provisioning of resources or "hot attach" 325. As used herein, the NIC 310 may be a SmartNIC or SkinnyNIC, the features of which are further described herein.

Figure 4:
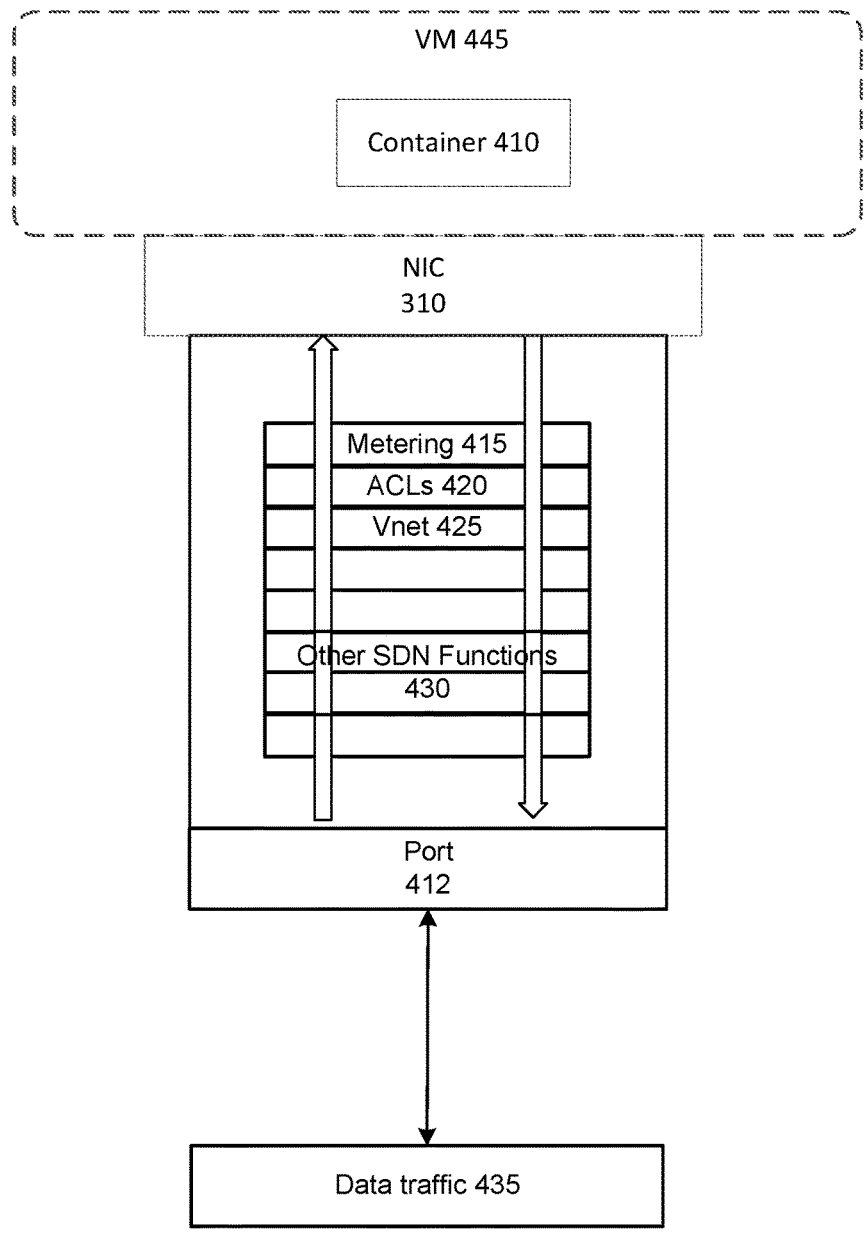
FIG. 4 is a diagram illustrating an architecture for implementing virtual services in accordance with the present disclosure.

FIG. 4 shows an example functional flow for a programmable connection processing and switching function 400 that enables data path isolation in a multi-tenant architecture by enforcing specific networking policies, which may be implemented in a SmartNIC as further described herein. The programmable connection processing and switching function 400 may provide capabilities to enforce policies and transform or tunnel data packets in a given computing workload that are entering and leaving VM 445. Case connections or flows are created by the programmable hardware of the programmable connection processing and switching function 400 and entered into a flow table that allows that connection/flow to be switched/encapsulated without the same inspection.

The networking policy functions may include those, in this example, relating to metering 415, access control lists (ACLs) 420, VNet addressing/routing 425, and other various SDN functions or features 430 which may include, for example, those pertaining to routing, tunneling, filtering, address translation, encryption, decryption, encapsulation, de-encapsulation, or quality of service (QoS).

Figure 5:
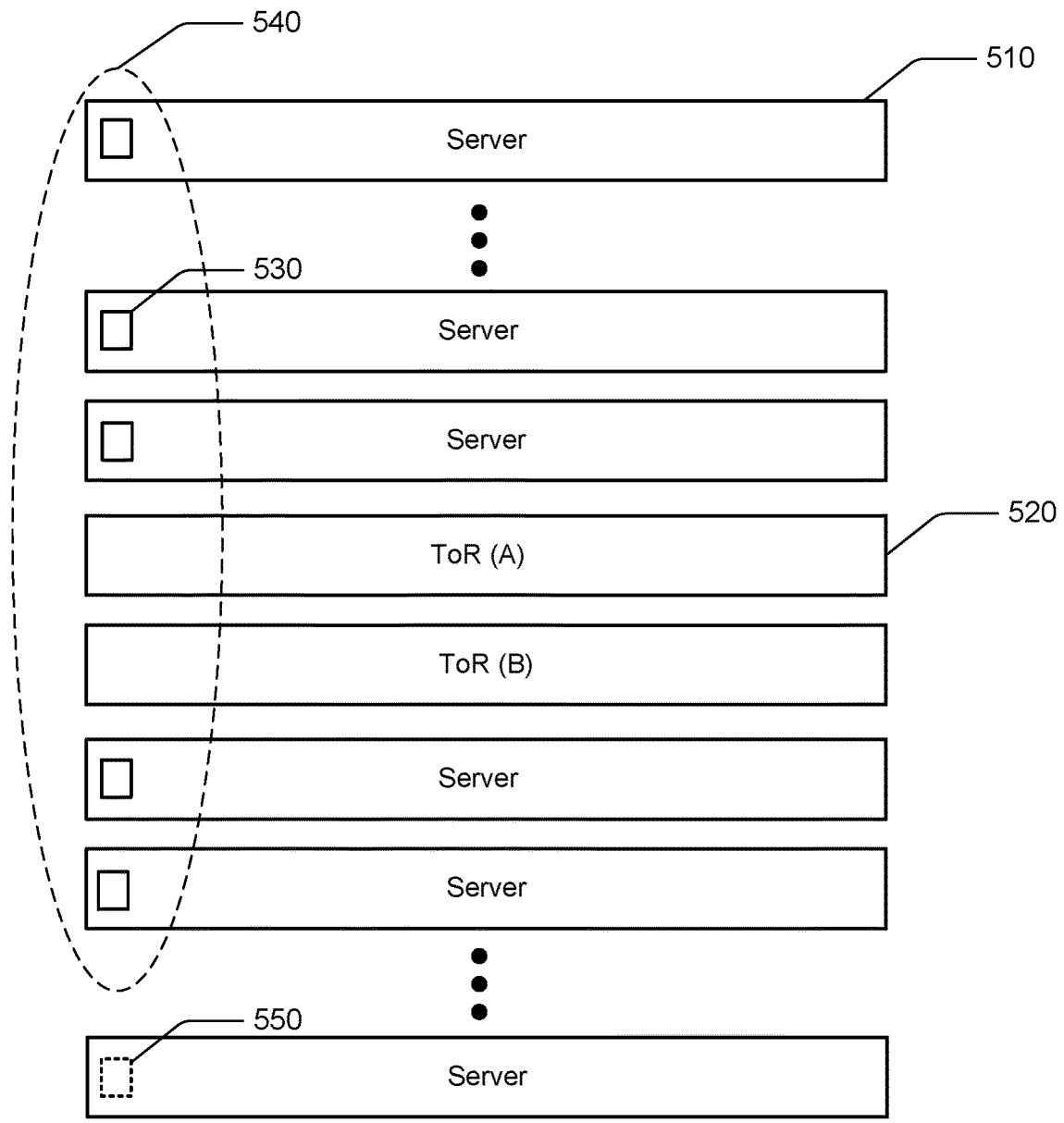
FIG. 5 is a diagram illustrating an example architecture in accordance with the present disclosure.

With reference to FIG. 5, illustrated is an example of implementing SmartNICs and SkinnyNICs in a virtual or distributed fashion to provide the disclosed flexible implementation approach. In the example of FIG. 5, SmartNICs and SkinnyNICs may be distributed in servers 510 rather than housed in a separate physical assembly. For example, each server 510 in the data center rack 500 may contain a SkinnyNIC 550 or a SmartNIC 530. The SmartNICs 530 may allow for virtual machines to communicate to any other VM through various types of virtual tunnel mechanisms. A number of SmartNICs 530 may be aggregated into a pool 540 of SmartNICs that may collectively provide policy application and other services for various virtual machines hosted in servers 510 or other host devices. Rack 500 may have one or more TORs 520 that provide routing capabilities to servers 510 in rack 500.

Figure 6:
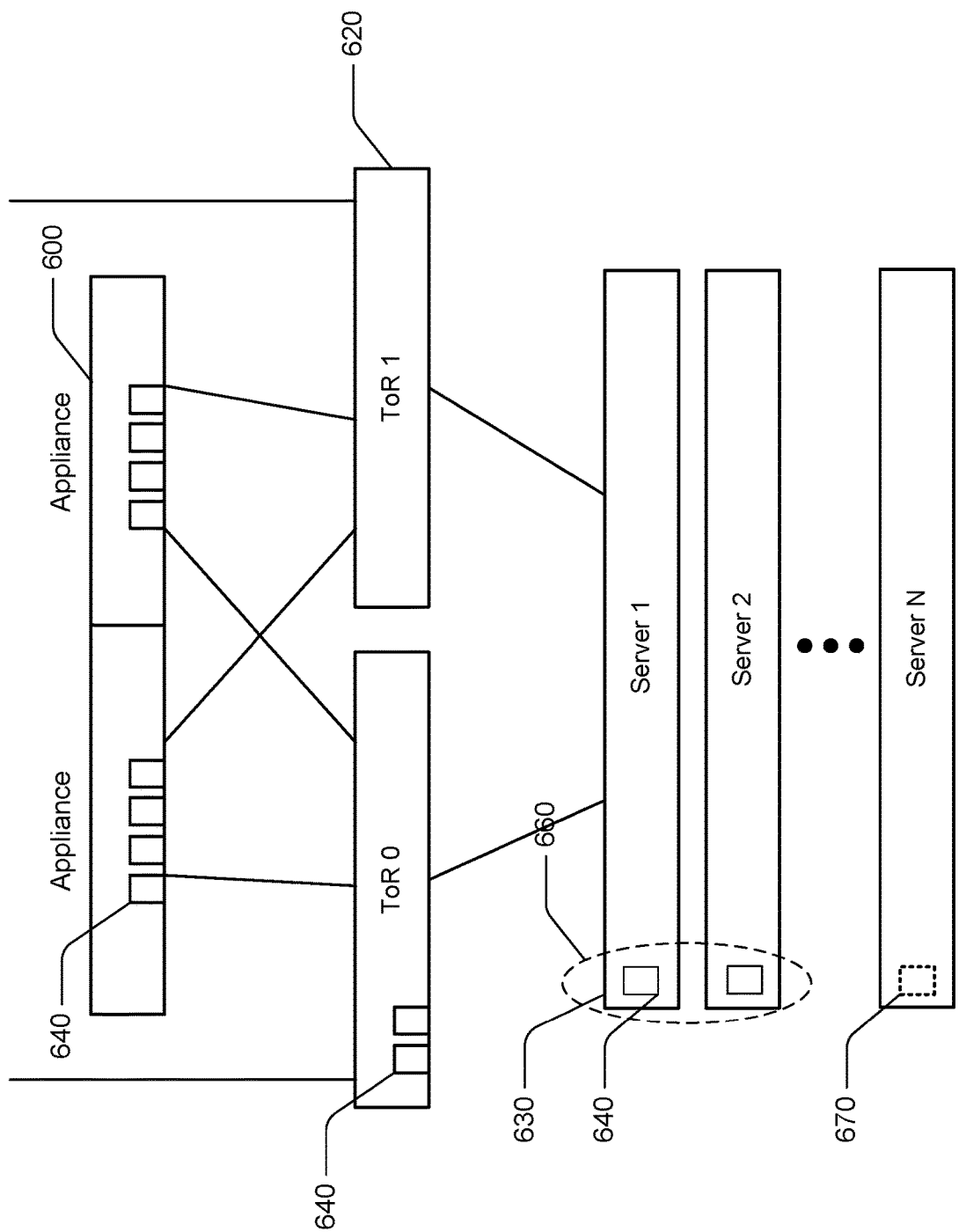
FIG. 6 is a diagram illustrating an example architecture in accordance with the present disclosure.

With reference to FIG. 6, illustrated is another example of SmartNIC disaggregation and pooling. In one implementation, SmartNICs 640 on Server 1 and Server 2 may be pooled into a SmartNIC pool 660. In an embodiment, the SmartNIC pool 660 may be cost optimized. A SkinnyNIC 670 may be implemented on at least one of the servers 630 for low function, cost, and low power. FIG. 6 further illustrates an example of a fault tolerant scheme that is resilient to ToR failure. In an embodiment, each ToR 620 may be fully connected to each server 630. FIG. 6 also shows that smartNICs 640 may be configured on appliances 600 or ToRs 620, for example. The smartNICs 640 configured on appliances 600 or ToRs 620 may be pooled in SmartNIC pool 660 or they may be pooled separately.

Figure 7:
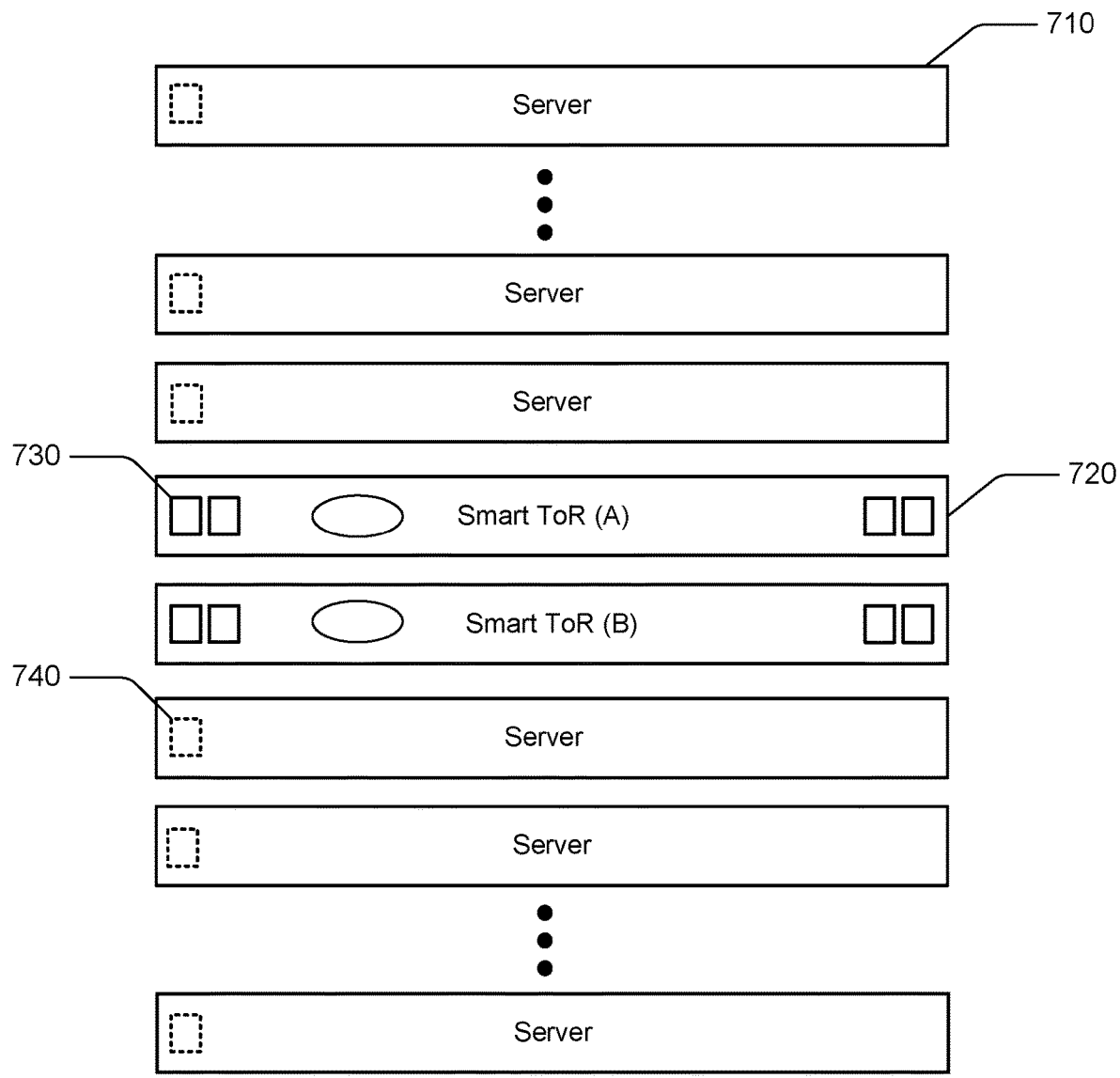
FIG. 7 is a diagram illustrating an example architecture in accordance with the present disclosure.

With reference to FIG. 7, illustrated is an embodiment of a data center rack 700 where SmartNICs 730 are distributed into SmartToRs 720 (e.g., SONiC-based ToRs). In an embodiment, the SmartToR 720 may include a switch and one or more SmartNICs 730. In one implementation, SmartToRs 730 may be interconnected similar to the data center rack shown in FIG. 6 by exposing NIC ports. In this implementation, the rack may be mechanically optimized and board optimized with fewer connectors and boards. In one embodiment, servers 710 may each have one SkinnyNIC 740. The SkinnyNIC 740 may be configured to provide secure virtual tunnels to a SmartNICs 730 on SmartToRs 720 that apply the cloud policies to allow VMs hosted on servers 710 to securely communicate. In this example, the SmartNICs 730 are located more centrally and independently of the physical location of the servers, and may serve an arbitrary number of VMs that are not constrained to a particular server.

Figure 8:
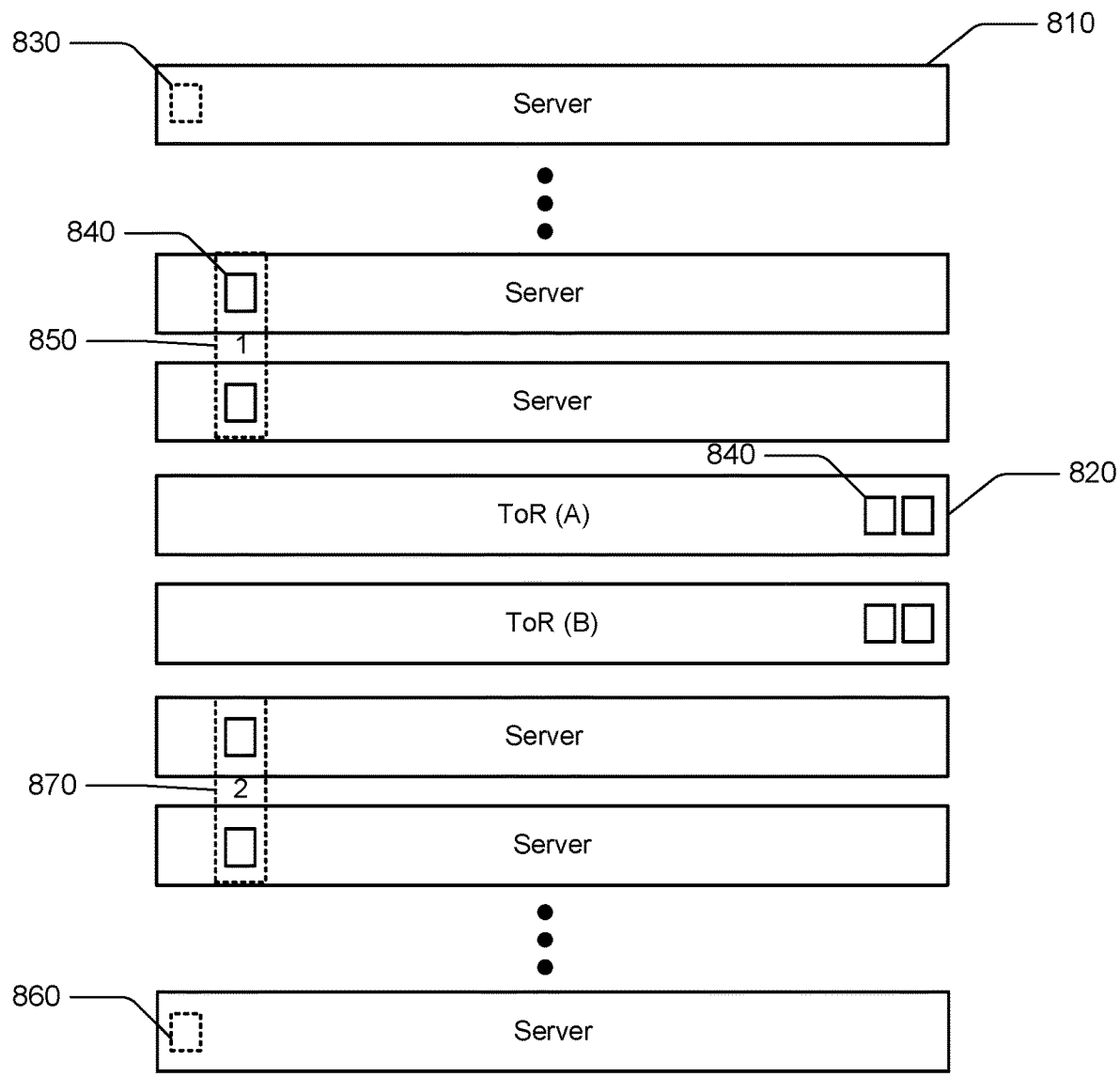
FIG. 8 is a diagram illustrating an example architecture in accordance with the present disclosure.

With reference to FIG. 8, illustrated is another embodiment of a data center rack 800 with distribution of smartNICs 840 among the servers 810 to create a distributed and aggregated virtual SmartNIC capability. This embodiment illustrates implementation of an aggregated SmartNIC pool 850 with N number of SmartNICs 840 (2 in this example). Servers 810 that do not have a SmartNIC 840 may have a SkinnyNIC 830. The ratio may be determined based on performance needs (e.g., a ratio of 3:1). Additionally, an additional SmartNIC pool 870 may be formed with additional smartNICs 840 on different servers 820.

Figure 9:
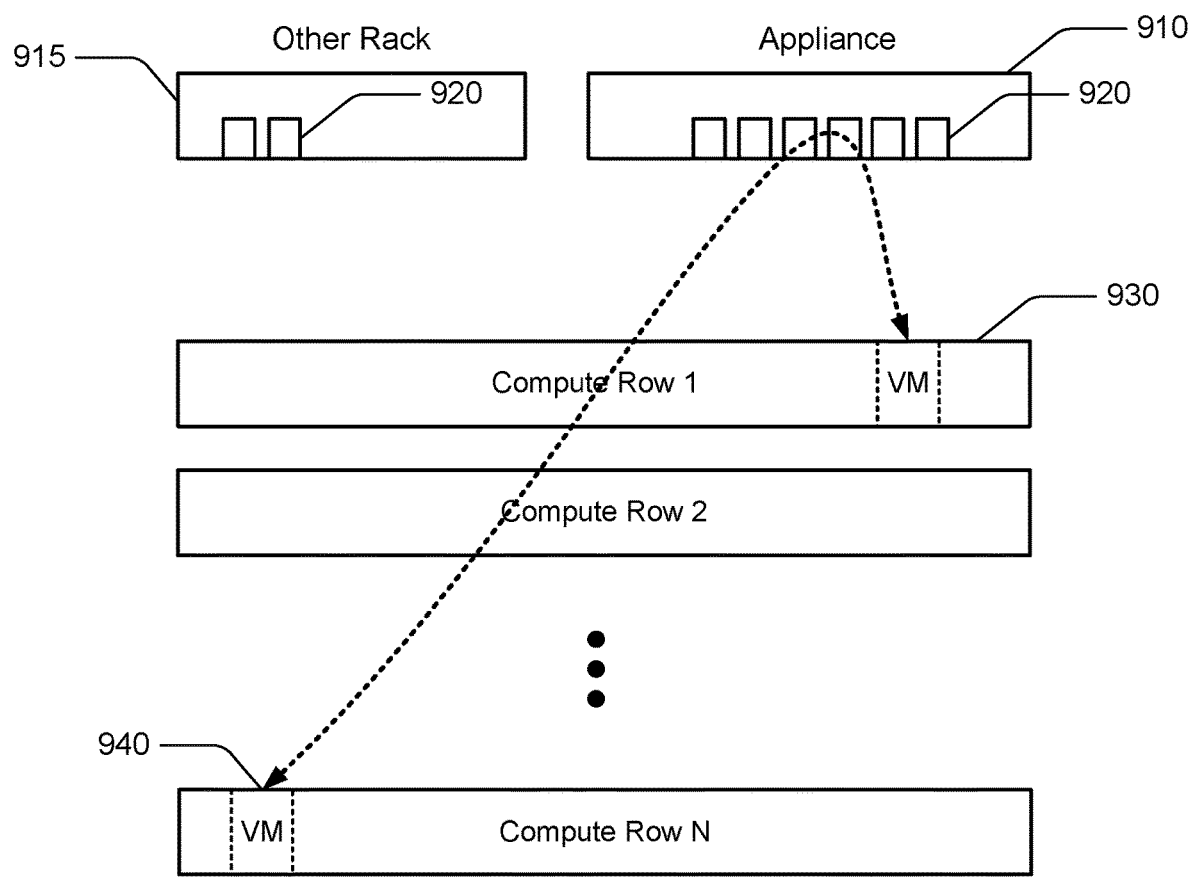
FIG. 9 is a diagram illustrating an example architecture in accordance with the present disclosure.

With reference to FIG. 9, illustrated is an example of a data center environment 900 with an SDN appliances 910 having one or more SmartNICs 920 and a rack 915 also having one or more SmartNICs 920. Also illustrates are a plurality of compute rows 930 having servers. Any virtual machine 940 running on any server in the data center rack can utilize the smart NICs 920 on SDN appliance 910 or smart NICs 920 on rack 915. For example, virtual machines with a high connections per second (CPS) or flow scale needs can send flows through a smart NIC on the SDN appliance.

Figure 10:
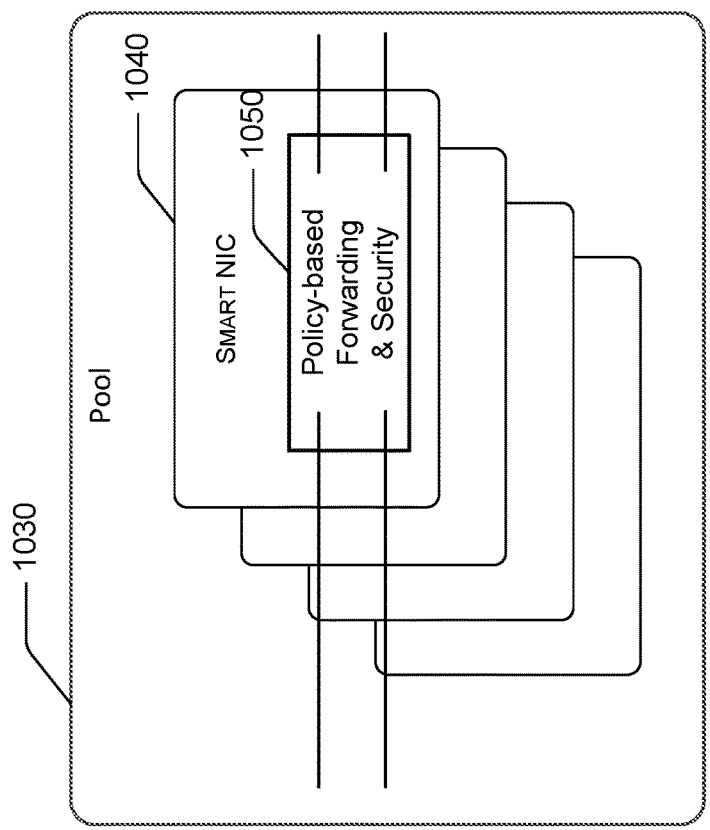
FIG. 10 is a diagram illustrating an example architecture in accordance with the present disclosure.
Figure 10:
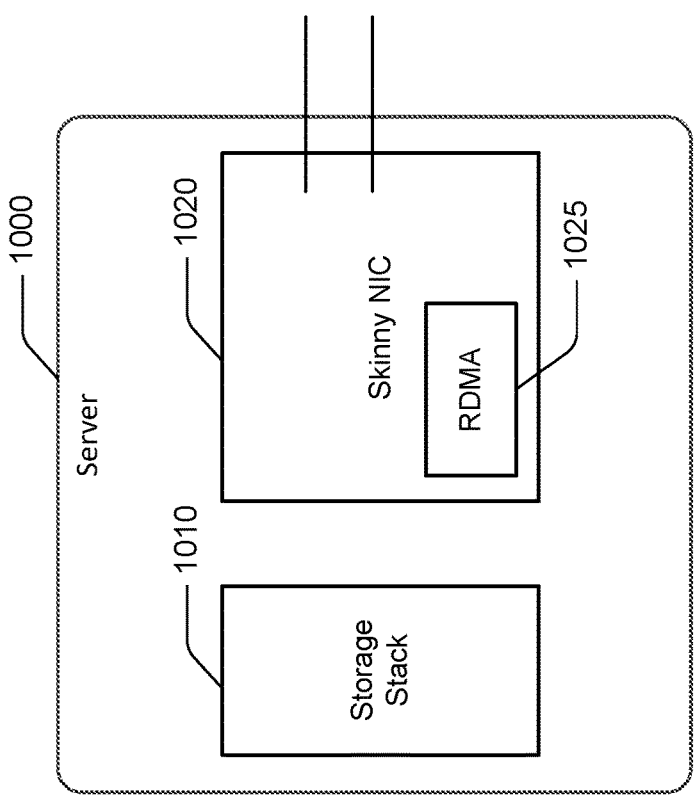

With reference to FIG. 10, the left side of the figure shows a standard NIC ("SkinnyNIC") 1020 that provides RDMA offload functionality 1025 and connectivity to the appliance. Networking traffic may be tunneled to the SmartNIC pool 1030. The right side of the figure shows stateful network policy-based forwarding and security 1050 performed on SmartNICs 1040.

Figure 11:
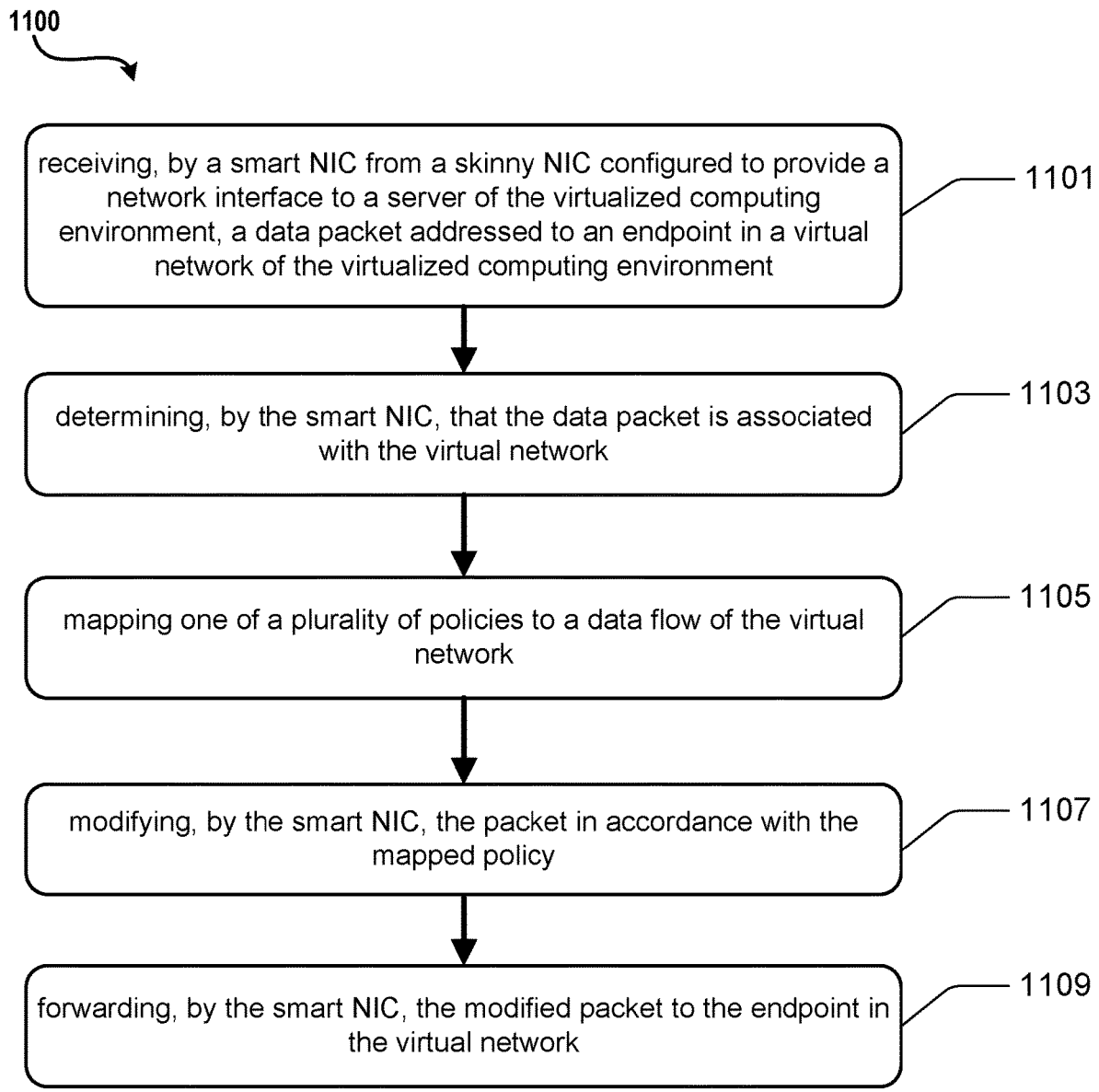
FIG. 11 is a flowchart depicting an example procedure in accordance with the present disclosure.

Turning now to FIG. 11, illustrated is an example operational procedure for processing data packets and implementing policies in a software defined network (SDN) of a virtual computing environment. The virtual computing environment comprises a plurality of servers hosting virtual machines. Each server is configured with one of a skinny NIC or a smart NIC. The skinny NIC is configured to provide network interfaces for virtual machines hosted on a local server, and the smart NIC is configured to enable virtual machine communications within a virtual network in accordance with associated policies. Such an operational procedure can be provided by one or more components illustrated in FIGS. 1 through 10. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 1600 is described as running on a system, it can be appreciated that the routine 1600 and other operations described herein can be executed on an individual computing device or several devices.

Referring to FIG. 11, operation 1101 illustrates receiving, at a skinny NIC configured on a server, a data packet addressed to an endpoint in a virtual network hosted by one of the virtual machines.

Operation 1101 may be followed by operation 1103. Operation 1103 illustrates forwarding, by the skinny NIC to a smart NIC configured outside of the server; the data packet.

Operation 1103 may be followed by operation 1105. Operation 1105 illustrates determining, by the smart NIC, that the data packet is associated with the virtual network.

Operation 1105 may be followed by operation 1107. Operation 1107 illustrates based on the determined association, mapping one of a plurality of policies to a data flow of the virtual network.

Operation 1107 may be followed by operation 1109. Operation 1109 illustrates modifying, by the smart NIC, the packet in accordance with the mapped policy.

Operation 1109 may be followed by operation 1110. Operation 1110 illustrates forwarding the modified packet to the endpoint in the virtual network.

Figure 12:
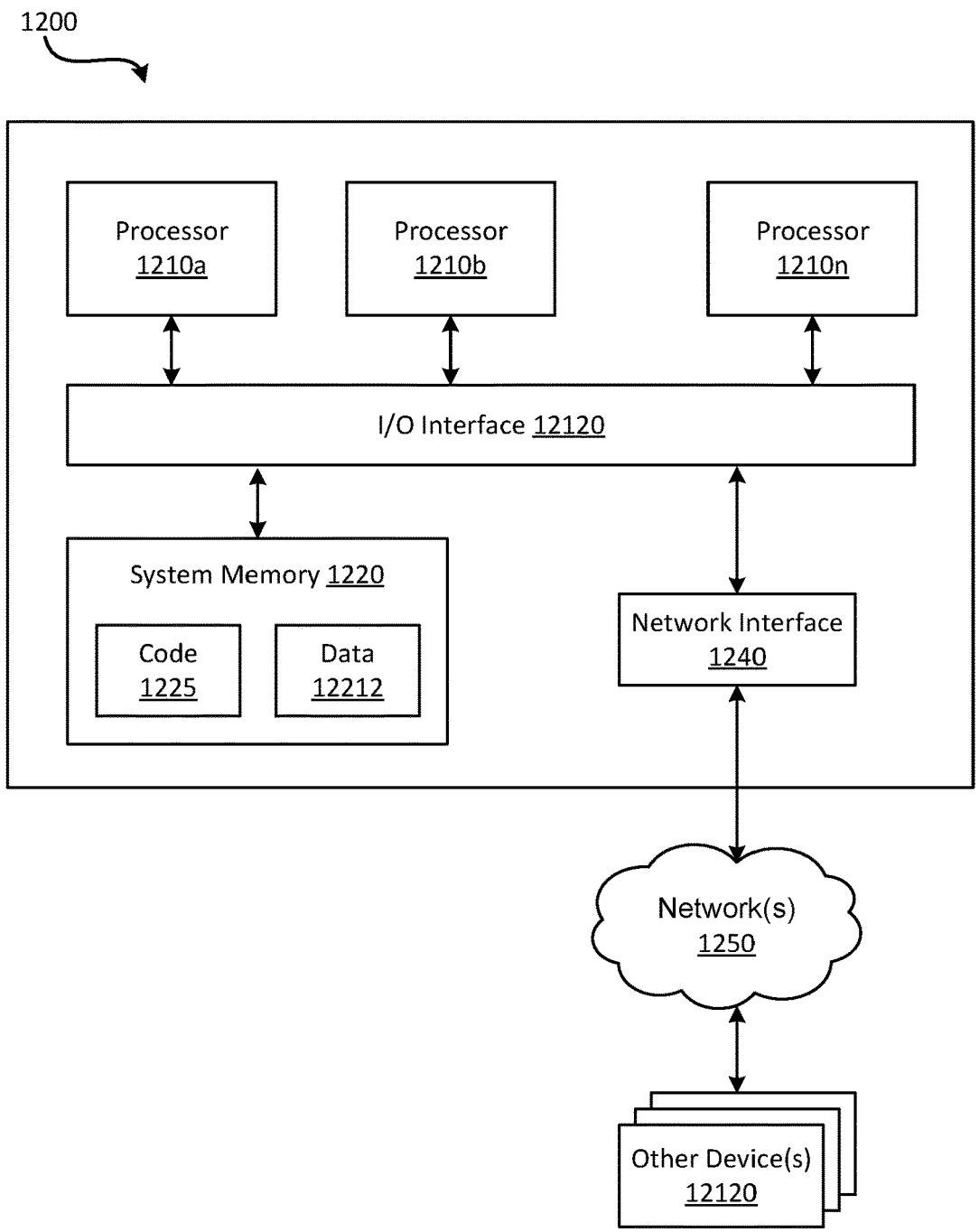
FIG. 12 is an example computing system in accordance with the present disclosure.

FIG. 12 illustrates a general-purpose computing device 1200. In the illustrated embodiment, computing device 1200 includes one or more processors 1210a, 1210b, and/or 1210n (which may be referred herein singularly as "a processor 1210" or in the plural as "the processors 1210") coupled to a system memory 1212 via an input/output (I/O) interface 1230. Computing device 1200 further includes a network interface 1240 coupled to I/O interface 1230.

In various embodiments, computing device 1200 may be a uniprocessor system including one processor 1210 or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x1212, PowerPC, SPARC, or MIPS ISAs, or any other suitable ISA. In multiprocessor systems, each of processors 1210 may commonly, but not necessarily, implement the same ISA.

System memory 1212 may be configured to store instructions and data accessible by processor(s) 1210. In various embodiments, system memory 1212 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1220 as code 1225 and data 12212.

In one embodiment, I/O interface 1230 may be configured to coordinate I/O traffic between the processor 1210, system memory 1212, and any peripheral devices in the device, including network interface 1240 or other peripheral interfaces. In some embodiments, I/O interface 1230 may perform any necessary protocol, timing, or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components. Also, in some embodiments some or all of the functionality of I/O interface 1230, such as an interface to system memory 1220, may be incorporated directly into processor 1210.

Network interface 1240 may be configured to allow data to be exchanged between computing device 1200 and other device or devices 12120 attached to a network or network(s) 12120, such as other computer systems or devices as illustrated in FIGS. 1 through 5, for example. In various embodiments, network interface 1240 may support communication via any suitable wired or wireless general data networks, such as types of Ethernet networks, for example. Additionally, network interface 1240 may support communication via telecommunications/telephony networks such as analog voice networks or digital fiber communications networks, via storage area networks such as Fibre Channel SANs or via any other suitable type of network and/or protocol.

In some embodiments, system memory 1220 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1200 via I/O interface 1230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic or digital signals, conveyed via a communication medium such as a network and/or a wireless link, such as may be implemented via network interface 1240. Portions or all of multiple computing devices, such as those illustrated in FIG. 12, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 12, may include other components that are not explicitly shown in FIG. 12, or may utilize an architecture completely different than that shown in FIG. 12.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for processing data packets in a software defined network (SDN) of a virtualized computing environment comprising a plurality of servers hosting virtual machines, each of the plurality of servers configured with one of a skinny network interface card (NIC) or a smart NIC, the skinny NIC configured to provide network interfaces for virtual machines hosted on a server configured with the skinny NIC, and the smart NIC configured to enable virtual network communications within a virtual network in accordance with associated policies that are applied by the smart NIC, the method comprising:

receiving, by a smart NIC from a skinny NIC configured to provide a network interface to a server of the virtualized computing environment, a data packet addressed to an endpoint in a virtual network of the virtualized computing environment, wherein the smart NIC is physically disaggregated outside of the server, and wherein the smart NIC is configured to enable virtual network communications within the virtual network in accordance with associated policies that are applied by the smart NIC;

determining, by the smart NIC, that the data packet is associated with the virtual network;

based on the determined association, mapping one of a plurality of policies to a data flow of the virtual network;

modifying, by the smart NIC, the packet in accordance with the mapped policy; and forwarding, by the smart NIC, the modified packet to the endpoint in the virtual network.

Clause 2: The method of clause 1, wherein the virtualized computing environment comprises a plurality of smart NICs that are physically distributed in the virtualized computing environment and the plurality of smart NICs are configured as a pooled resource.

Clause 3: The method of any of clauses 1-2, wherein the skinny NIC is coupled to the server in a rack of the virtualized computing environment and the smart NIC is coupled to another server within the rack.

Clause 4: The method of any of clauses 1-3, wherein the skinny NIC is coupled to the server in a rack of the virtualized computing environment and the smart NIC is coupled to a server in a different rack.

Clause 5: The method of any of clauses 1-4, wherein the skinny NIC is coupled to the server in the virtualized computing environment and the smart NIC is coupled to a separate device in the virtualized computing environment.

Clause 6: The method of any of clauses 1-5, wherein the configured pooled resource comprises distribution of multiple connections of a selected virtual machine across a plurality of smart NICs that are in the pooled resource.

Clause 7: A system comprising:

a plurality of servers, each of the servers communicatively coupled to network interfaces of one of a skinny NIC or a smart NIC, the skinny NIC configured to provide network interfaces for virtual machines hosted on a corresponding server, and the smart NIC configured to enable virtual machine communications within a virtual network in accordance with associated policies that are applied by the smart NIC;

the system configured to:

receive, at a skinny NIC configured to provide a network interface to a first server of the plurality of servers, a data packet addressed to an endpoint in a virtual network hosted by virtual machines hosted on the plurality of servers;

forward, by the skinny NIC to a smart NIC configured to a second server of the plurality of servers, the data packet;

determine, by the smart NIC, that the data packet is associated with the virtual network;

based on the determined association, map one of a plurality of policies to a data flow of the virtual network;

modify, by the smart NIC, the packet in accordance with the mapped policy; and forward, by the smart NIC, the modified packet to the endpoint in the virtual network, the endpoint associated with a virtual machine of the virtual computing environment.

Clause 8: The system of clause 7, wherein a plurality of smart NICs are physically distributed in a virtualized computing environment and the plurality of smart NICs are configured as a pooled resource.

Clause 9: The system of any of clauses 7 and 8, wherein the skinny NIC is coupled to a server in the virtualized computing environment and the smart NIC is coupled to a different server in the virtual computing environment.

Clause 10: The system of any clauses 7-9, wherein the skinny NIC is coupled to a server in the virtualized computing environment and the smart NIC is coupled to a server in a different rack.

Clause 11: The system of any clauses 7-10, wherein the skinny NIC is coupled to a server in a virtualized computing environment and the smart NIC is coupled to a device in the virtualized computing environment.

Clause 12: The system of any clauses 7-11, wherein the configured pooled resource comprises distribution of multiple connections of a selected virtual machine across a plurality of smart NICs that are in the pooled resource.

Clause 13: The system of any clauses 7-12, wherein a ratio of skinny NICs to smart NICs is determined based on power and bandwidth constraints.

Clause 14: The system of any clauses 7-13, wherein the skinny NICs have multiple interfaces and are configured to tunnel data traffic to multiple SmartNICs.

Clause 15: A data center rack comprising:

a plurality of servers communicatively coupled to network interfaces of one of a skinny NIC or a smart NIC, the skinny NIC configured to provide network interfaces for virtual machines hosted on a server communicatively coupled to the skinny NIC, and the smart NIC configured to enable virtual network communications within a virtual network in accordance with associated policies that are applied by the smart NIC;

the data center rack configured to:

receive, at a skinny NIC configured to provide a network interface to a server of the plurality of servers, a data packet addressed to an endpoint in the virtual network;

forward, by the skinny NIC, the data packet to a smart NIC;

determine, by the smart NIC, that the data packet is associated with the virtual network;

based on the determined association, map one of a plurality of policies to a data flow of the virtual network;

modify, by the smart NIC, the packet in accordance with the mapped policy.

Clause 16: The computing environment of clause 15, wherein the smart NICs are physically distributed among plurality of servers and the smart NICs are configured as a pooled resource.

Clause 17: The computing environment of any of clauses 15 and 16, wherein the configured pooled resource comprises distribution of multiple connections of a selected virtual machine across a plurality of smart NICs that are in the pooled resource Clause 18: The computing environment of any of the clauses 15-17, wherein a total capacity of the configured pooled resource is monitored and managed.

Clause 19: The computing environment of any of the clauses 15-18, wherein rack comprises a top-of-rack switch, the skinny NIC is coupled to a server in the rack, and the smart NIC is coupled to the top-of-rack switch Clause 20: The computing environment of any of the clauses 15-19, wherein a ratio of skinny NICs to smart NICs is determined based on power and bandwidth constraints.

What is claimed is:

1. A method for processing data packets in a software defined network (SDN) of a virtualized computing environment comprising a plurality of servers hosting virtual machines, each of the plurality of servers configured with one of a skinny network interface card (NIC) or a smart NIC, the skinny NIC configured to provide network interfaces for virtual machines hosted on a server configured with the skinny NIC, and the smart NIC configured to enable virtual network communications within a virtual network in accordance with associated policies that are applied by the smart NIC, the method comprising:
- receiving, by a smart NIC from a skinny NIC configured to provide a network interface to a server of the virtualized computing environment, a data packet addressed to an endpoint in a virtual network of the virtualized computing environment, wherein the smart NIC is physically disaggregated outside of the server, and wherein the smart NIC is configured to enable virtual network communications within the virtual network in accordance with associated policies that are applied by the smart NIC;
- determining, by the smart NIC, that the data packet is associated with the virtual network;
- based on the determining that the data packet is associated with the virtual network, mapping one of a plurality of policies to a data flow of the virtual network;
- modifying, by the smart NIC, the packet in accordance with the mapped one of the plurality of policies; and
- forwarding, by the smart NIC, the modified packet to the endpoint in the virtual network.

2. The method of claim 1, wherein the virtualized computing environment comprises a plurality of smart NICs that are physically distributed in the virtualized computing environment and the plurality of smart NICs are configured as a pooled resource.

3. The method of claim 2, wherein the configured pooled resource comprises distribution of multiple connections of a selected virtual machine across a plurality of smart NICs that are in the pooled resource.

4. The method of claim 1, wherein the skinny NIC is coupled to the server in a rack of the virtualized computing environment and the smart NIC is coupled to another server within the rack.

5. The method of claim 1, wherein the skinny NIC is coupled to the server in a rack of the virtualized computing environment and the smart NIC is coupled to a server in a different rack.

6. The method of claim 1, wherein the skinny NIC is coupled to the server in the virtualized computing environment and the smart NIC is coupled to a separate device in the virtualized computing environment.

7. A system comprising:
- a plurality of servers, each of the servers communicatively coupled to network interfaces of one of a skinny NIC or a smart NIC, the skinny NIC configured to provide network interfaces for virtual machines hosted on a corresponding server, and the smart NIC configured to enable virtual machine communications within a virtual network in accordance with associated policies that are applied by the smart NIC;
- the system configured to:
- receive, at a skinny NIC configured to provide a network interface to a first server of the plurality of servers, a data packet addressed to an endpoint in a virtual network hosted by virtual machines hosted on the plurality of servers;
- forward, by the skinny NIC to a smart NIC configured to a second server of the plurality of servers, the data packet;
- determine, by the smart NIC, that the data packet is associated with the virtual network;
- based on determining that the data packet is associated with the virtual network, map one of a plurality of policies to a data flow of the virtual network;
- modify, by the smart NIC, the packet in accordance with the mapped one of the plurality of policies; and
- forward, by the smart NIC, the modified packet to the endpoint in the virtual network, the endpoint associated with a virtual machine of the virtual computing environment.

8. The system of claim 7, wherein a plurality of smart NICs are physically distributed in a virtualized computing environment and the plurality of smart NICs are configured as a pooled resource.

9. The system of claim 8, wherein the skinny NIC is coupled to a server in the virtualized computing environment and the smart NIC is coupled to a different server in the virtual computing environment.

10. The system of claim 8, wherein the skinny NIC is coupled to a server in the virtualized computing environment and the smart NIC is coupled to a server in a different rack.

11. The system of claim 8, wherein the configured pooled resource comprises distribution of multiple connections of a selected virtual machine across a plurality of smart NICs that are in the pooled resource.

12. The system of claim 7, wherein the skinny NIC is coupled to a server in a virtualized computing environment and the smart NIC is coupled to a device in the virtualized computing environment.

13. The system of claim 7, wherein a ratio of skinny NICs to smart NICs is determined based on power and bandwidth constraints.

14. The system of claim 7, wherein the skinny NICs have multiple interfaces and are configured to tunnel data traffic to multiple SmartNICs.

15. A data center rack comprising:
- a plurality of servers communicatively coupled to network interfaces of one of a skinny NIC or a smart NIC, the skinny NIC configured to provide network interfaces for virtual machines hosted on a server communicatively coupled to the skinny NIC, and the smart NIC configured to enable virtual network communications within a virtual network in accordance with associated policies that are applied by the smart NIC;
- the data center rack configured to:
- receive, at a skinny NIC configured to provide a network interface to a server of the plurality of servers, a data packet addressed to an endpoint in the virtual network;
- forward, by the skinny NIC, the data packet to a smart NIC;
- determine, by the smart NIC, that the data packet is associated with the virtual network;
- based on determining that the data packet is associated with the virtual network, map one of a plurality of policies to a data flow of the virtual network; and
- modify, by the smart NIC, the packet in accordance with the mapped one of the plurality of policies policy.

16. The data center rack of claim 15, wherein the smart NICs are physically distributed among plurality of servers and the smart NICs are configured as a pooled resource.

17. The data center rack of claim 16, wherein the configured pooled resource comprises distribution of multiple connections of a selected virtual machine across a plurality of smart NICs that are in the pooled resource.

18. The data center rack of claim 17, wherein a ratio of skinny NICs to smart NICs is determined based on power and bandwidth constraints.

19. The data center rack of claim 16, wherein a total capacity of the configured pooled resource is monitored and managed.

20. The data center rack of claim 15, wherein rack comprises a top-of-rack switch, the skinny NIC is coupled to a server in the rack, and the smart NIC is coupled to the top-of-rack switch.

* * * * *